United States Patent [19]

Tamura et al.

[11] Patent Number: 5,211,270
[45] Date of Patent: May 18, 1993

[54] TORQUE CONVERTER LOCK-UP DEVICE

[75] Inventors: Kazuhisa Tamura; Takao Fukunaga, all of Neyagawa, Japan

[73] Assignee: Daikin Clutch Corporation, Neyagawa, Japan

[21] Appl. No.: 783,034

[22] Filed: Oct. 25, 1991

[30] Foreign Application Priority Data

Oct. 29, 1990 [JP] Japan .................................. 2-292759

[51] Int. Cl.⁵ .......................................... F16H 45/02
[52] U.S. Cl. ............................... 192/3.29; 192/70.28; 192/101; 192/109 R
[58] Field of Search .................. 192/3.29, 3.3, 70.28, 192/109 R, 101, 3.28, 70.12

[56] References Cited

U.S. PATENT DOCUMENTS

| | | | |
|---|---|---|---|
| 2,995,956 | 8/1961 | Moore | 192/3.3 X |
| 3,240,308 | 3/1966 | Frost | 192/3.3 X |
| 3,613,848 | 10/1971 | Reiff | 192/70.28 |
| 4,027,757 | 6/1977 | Radke et al. | 192/3.29 X |
| 4,056,177 | 11/1977 | Ahlen et al. | 192/3.3 X |
| 4,177,885 | 12/1979 | Ross | 192/3.3 |
| 4,240,532 | 12/1980 | Blomquist | 192/3.28 |
| 4,785,924 | 11/1988 | Jackel | 192/3.29 |
| 4,821,855 | 4/1989 | Jackel | 192/3.29 |

FOREIGN PATENT DOCUMENTS

| | | | |
|---|---|---|---|
| 1020496 | 12/1957 | Fed. Rep. of Germany | 192/70.28 |
| 2635845 | 3/1990 | France | 192/3.3 |
| 0245562 | 10/1990 | Japan | 192/3.3 |
| 1278519 | 12/1986 | U.S.S.R. | 192/70.28 |

Primary Examiner—Rodney H. Bonck
Attorney, Agent, or Firm—Armstrong, Westerman, Hattori, McLeland & Naughton

[57] ABSTRACT

A lock-up device disposed between a front cover and a turbine coaxial with the front cover of a torque converter includes a piston elastically connected to the turbine, a plurality of friction discs provided between the piston and the front cover, and an elastic member for spacing the friction discs apart from one another when the device is disengaged. When this lock-up device is engaged, the piston presses the friction discs against the front cover, whereby torque is transmitted to the turbine through the friction discs and the piston. When the lock-up device is disengaged, the piston is moved away from the front cover, and the elastic member spaces the friction discs apart from one another so as not to transmit torque. The performance of the lock-up device is thus improved in order to decrease drag torque.

6 Claims, 2 Drawing Sheets

TORQUE CONVERTER LOCK-UP DEVICE

BACKGROUND OF THE INVENTION

The present invention relates generally to a lock-up device. More specifically, it relates to a lock-up device for a torque converter.

Generally, a torque converter can accelerate or decelerate an automobile smoothly because it transmits power by the agency of a fluid. However, such disadvantages as inefficient fuel consumption and energy loss due to fluid slip can stem from torque converters.

Therefore, some conventional torque converters have a lock-up device disposed between the input-side front cover and the turbine connected to the output shaft. The lock-up device includes a piston which is pressed against the front cover by hydraulic drive in order to transmit power directly. Owing to the difficulty of transmitting a large torque to the output-side member only through the contact of the piston against the front cover, one type of lock-up device has been developed which has a plurality of friction discs provided between the front cover and the piston in order to improve torque transmission capability.

When this type of lock-up device is in engagement, the piston, under hydraulic power, and the front cover sandwich the friction discs, pressing the friction discs against each other. Consequently, the torque of the front cover is transmitted to the piston through the friction discs, thereby to rotate the output shaft.

When the lock-up device is in disengagement, the friction discs, which should remain spaced apart from one another, are forced toward the piston due to the flow of hydraulic fluid through the gaps between the piston and front cover. Consequently, the friction members and the piston come into contact, transmitting the rotation of the front cover to the piston through the friction members, and creating a drag torque in the output shaft.

SUMMARY OF THE INVENTION

An object of the present invention is to decrease drag torque transmitted by a lock-up device in disengagement.

A lock-up device for a torque converter according to the present invention is disposed between an input-side member of a torque converter and an output-side member coaxial with the input-side member. The lock-up device includes a piston elastically connected to the output-side member, a plurality of friction discs provided between the piston and the input-side member, and an elastic member for spacing the friction discs apart from one another when the device is disengaged.

When this lock-up device is engaged, the piston presses the friction discs against the input-side member, whereby torque of the input-side member is transmitted to the output-side member through the friction discs and the piston. When the lock-up device is disengaged, the piston is moved away from the input-side member, and the elastic member spaces the friction discs apart from one another so as to prevent the transmission of torque. The performance of the lock-up device is thus improved, decreasing its drag torque.

The foregoing and other objects, aspects and advantages of the present invention will become more apparent from the following detailed description when taken in conjunction with the accompanying drawings.

DESCRIPTION OF THE PREFERRED EMBODIMENT

Figure 1:
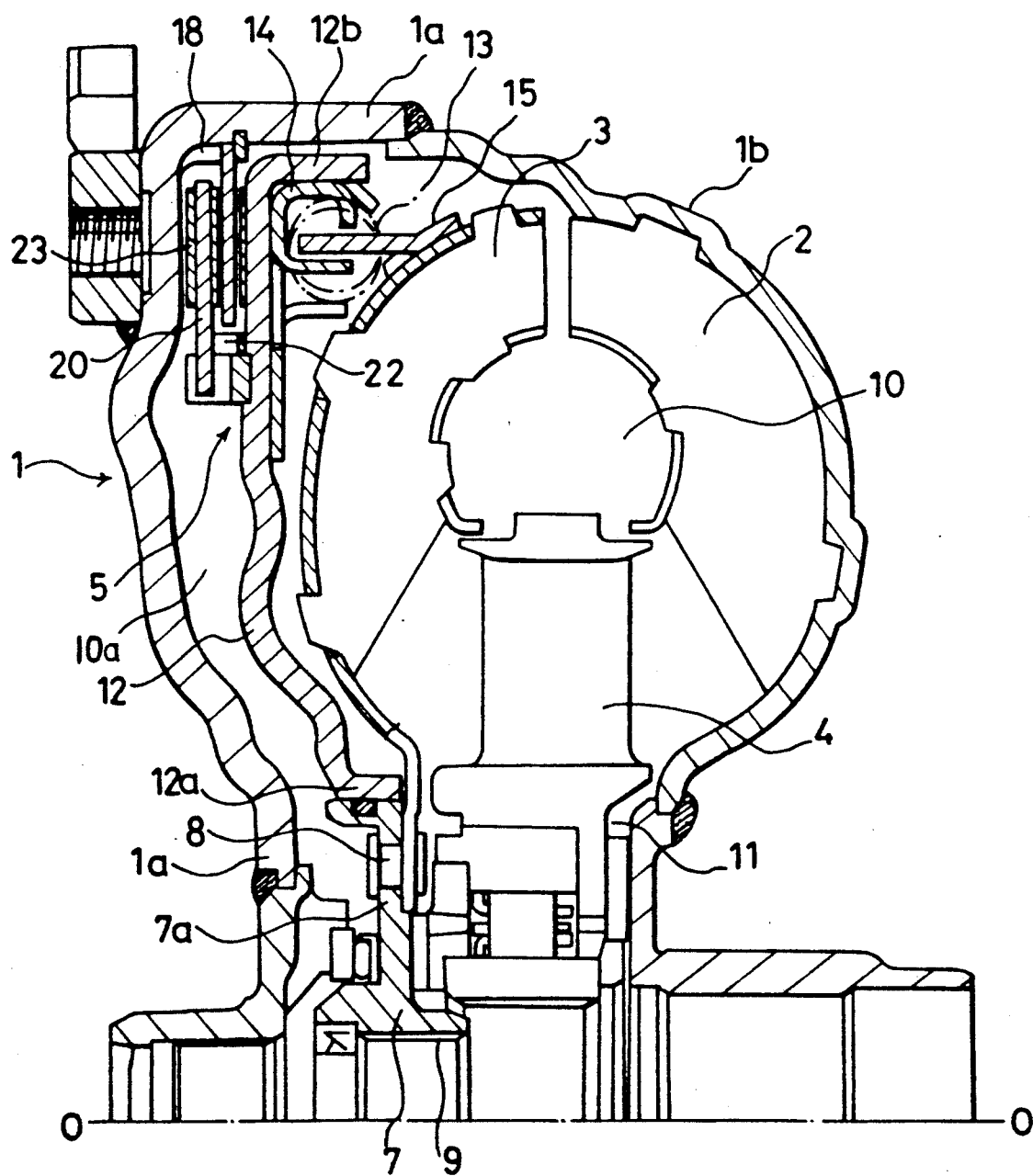
FIG. 1 is a sectional view showing a torque converter according to an embodiment of the present invention.

FIG. 1 shows a torque converter to which an embodiment according to the present invention is applied. In the figure, the line O—O is the axis of rotation of the torque convertor.

This torque converter is composed principally of a front cover 1, three types of vane wheels (pump 2, turbine 3 and stator 4) coaxial with the front cover 1, and a lock-up device 5 disposed between the front cover 1 and the vane wheels.

The front cover 1 is connected to the crankshaft of an engine (not shown). Integrally fixed to the rear (rightward in FIG. 1) of a projecting rim portion $1a$ of the front cover 1 is an impeller shell $1b$ in which the pump 2 comprising a plurality of vanes is provided. A turbine 3 comprising a plurality of vanes is disposed opposite the pump 2. The radially inner portion of the turbine 3 is fixed to a flange $7a$ of a turbine hub 7 by means of rivets 8. The turbine hub 7 has inside splines 9 which are for mesh with an output shaft (not shown). A stator 4 is disposed between the radially inner portions of the pump 2 and the turbine 3.

The space enclosed by the front cover 1 and the impeller shell $1b$ forms a hydraulic fluid chamber 10 containing the three kinds of vane wheels (pump 2, turbine 3 and stator 4). A hydraulic pressure control (not shown) supplies hydraulic fluid through an inlet $11$ to this hydraulic fluid chamber 10.

The lock-up device 5 is disposed between and coaxial with the turbine 3 and the front cover 1 and includes a disc-like piston 12 whose radially inner portion $12a$ is slidably retained by the flange $7a$ of the turbine hub 7. The piston 12 has projecting rim portion $12b$ protruding toward the turbine 3.

Inward of the peripheral ring portion $12b$ of the piston 12, a plurality of torsion springs 13 extending circumferentially are disposed. A retaining plate 14 fixed to the backside of the piston 12 has bent portions which seat the ends of the torsion springs 13. Turbine seats 15 fixed to the radially outer portion of the turbine 3 also retain the ends of the torsion springs 13, whereby the turbine 3 is in circumferentially elastic connection with the piston 12.

Figure 2:
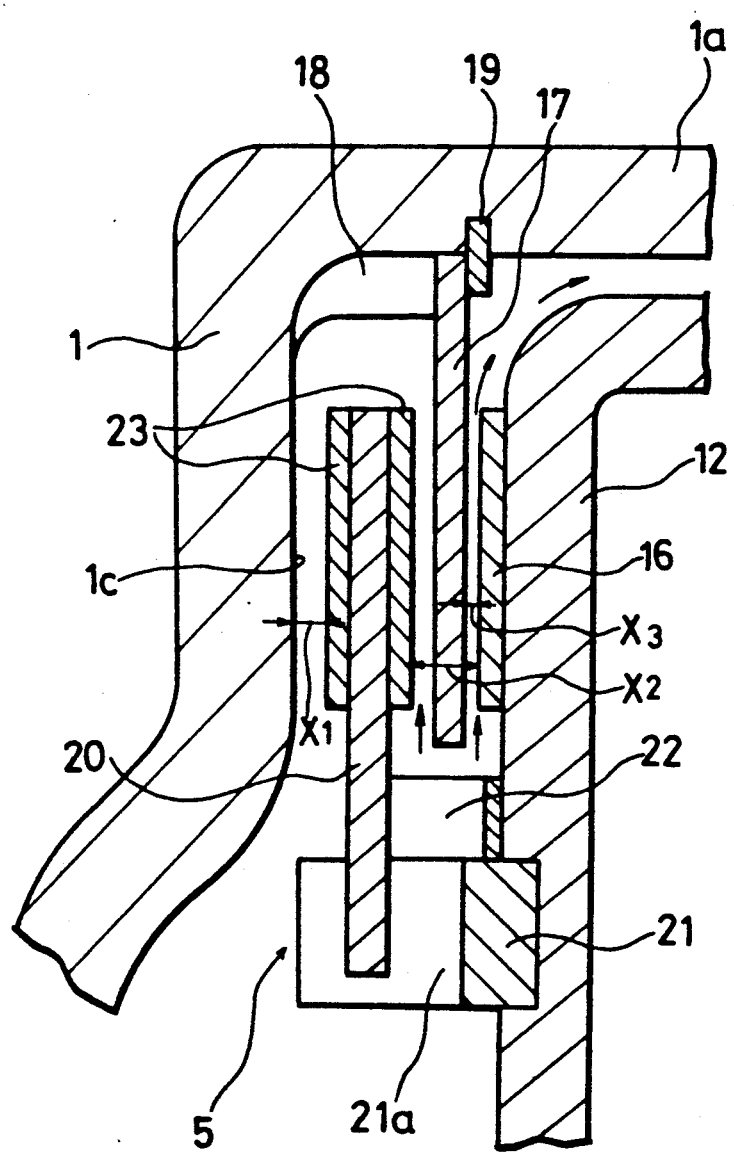
FIG. 2 is an enlarged partial view of FIG. 1.

As shown in FIG. 2, an annular friction member 16 is affixed along the margin of the lateral surface of the piston 12 which is opposite a flat friction surface $1c$ of the front cover 1. Between the friction surface $1c$ and the friction member, a first annular disc 20 and second annular disc 17 are located coaxially in that order from the friction surface $1c$.

Integral with the front cover 1 are a plurality of guide ribs 18 which extend in the axial direction along the inner surface of the ring portion $1a$ and are equidistant in the circumferential direction. The radially outer edge of the second disc 17 is engaged with the ribs 18, whereby the second disc 17 cannot rotate relative to the ribs 18 but can slide in the axial direction. A snap ring 19 is fixed into the rim portion $1a$ against the ends (rightward ends in FIG. 2) of the ribs 18, such that when the second disc 17 comes into contact with the snap ring 19 the second disc 17 is prevented from sliding out of mesh with the ribs 18.

An annular support member 21 is fixed into the surface of the friction-member-side of the piston 12 inward of the second disc 17. The support member 21 is provided with a number of slots 21a formed radially in a portion adjacent to the friction surface 1c. The first disc 20 is located between the second disc 17 and the friction surface 1c and is engaged in the slots 21a of the support member 21, whereby the first disc 20 cannot rotate relative to the support member 21 but can slide on it in the axial direction. Annular friction members 23 of a pair are affixed onto both lateral surfaces of the first disc 20, and thus present surfaces which are opposite to the second disc 17 and to the friction surface 1c.

An annular wave spring 22 is fitted around the support member 21 between the piston 12 and the first disc 20. In the state shown in FIG. 2, in which the lock-up device 5 is released, the wave spring 22 does not push the first disc 20 forward, yet prevents the first disc 20 from moving backward. As a result, the separation clearances among the friction member 16, the second disc 17, the first disc 20 and the front cover 1 therein may be securely maintained. Specifically, the wave spring 22 maintains clearance $X_1$ between the front cover 1 and the first disc 20, and clearance $X_2$ between the first disc 20 and the friction member 16. In addition, the snap ring 19 maintains clearance $X_3$ between the second disc 17 and the friction member 16.

The operation of the torque converter will now be described.

When the engine operates, its crank shaft rotates the front cover 1 and the pump 2, whereby the torque from the engine is transmitted to the turbine 3 by agency of the hydraulic fluid. The stator 4 regulates the hydraulic fluid flow between the turbine 3 and the pump 2 whereby a high torque ratio is obtained when the pump 2 rotates at a high speed and the turbine 3 rotates at a low speed. The torque of the turbine 3 is transmitted to the output shaft through the turbine hub 7.

When the output shaft attains a predetermined speed of rotation, the hydraulic pressure in the hydraulic fluid chamber 10 increases whereupon the hydraulic fluid in the gap 10a between the front cover 1 and the piston 12 is bled by the hydraulic pressure control and the piston 12 is driven forward to effect a lock-up engagement. As a result, the piston 12 presses the second disc 17 and the first disc 20 against the friction surface 1c of the front cover 1, compressing the wave spring 22. Consequently, the torque of the front cover 1 is transmitted to the piston 12 through the second disc 17 and the first disc 20, and to the turbine 3 through the retaining plate 14 and the torsion springs 13. Thus, the torque of the front cover 1 is mechanically transmitted to the output shaft (not shown) engaged with the turbine hub 7, thereby effecting a reduction in energy loss and fuel consumption. In addition, since the lock-up device 5 is engaged through a plurality of friction discs, a strong frictional bond is achieved in engagement in order to transmit high torque.

When the hydraulic pressure in the hydraulic fluid chamber 10 decreases and the hydraulic pressure in the gap 10a between the front cover 1 and the piston 12 is increased by the hydraulic pressure control, the piston 12 moves backward, effecting release of the lock-up engagement. As a result, the pressure of the piston 12 against the friction surface 1c is released, whereby the piston 12, the disc 17, the disc 20 and the friction surface 1c separate from one another.

When the lock-up device 5 is released, the hydraulic fluid between the front cover 1 and the piston 12 flows radially outward in the direction indicated by the arrows in FIG. 2. The hydraulic fluid thus draws the disc 20 and the disc 17 toward the piston 12. However, since movement of the disc 20 and the disc 17 toward the piston 12 is restricted by the wave spring 22 and the snap ring 19, fixed clearances are securely maintained between the first disc 20, the second disc 17 and the piston 12. At the given clearances, contact among the front cover 1, the discs 17 and 20 and the piston 12 is prevented. Consequently, no torque from the front cover 1 can be transmitted to the piston 12 through the released lock-up device 5, whereby torque due to lock-up device 5 drag is not generated in the output shaft.

Modification

In the aforementioned embodiment, the wave spring 22 and the snap ring 19 are used to keeps separate the discs 20 and 17, respectively. The wave spring 22 and the snap ring 19, however, may be replaced with other kinds of elastic members or retainers.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A lock-up device for a torque converter disposed coaxially between an input member and an output member, said lockup device comprising:

a piston rotatively connected with said output member;

a first annular friction member mounted on said piston for rotation therewith and having axial movement with respect thereto;

an elastic member disposed between said piston and said first annular friction member to maintain a spacing therebetween;

said input member being connected with a front cover of said torque converter;

a second annular friction member mounted in said front cover for rotation therewith and having axial movement with respect thereto;

a stop member fixed to said front cover to limit axial movement of said second annular friction member in a direction toward said piston;

said first annular friction member being disposed between said second annular friction member and a friction surface of said front cover, and said second annular friction member being disposed between said first annular friction member and a friction surface of said piston;

said front cover, first and second annular friction members and piston being mutually engaged to rotate together in a lock-up position of said piston; and when lock-up is released, said first annular friction member is separated from said front cover friction surface and is maintained at said spacing from said piston against said elastic member and said second annular friction member is urged against said stop member by circulation of fluid in said torque converter, such that said friction members and said friction surfaces are disengaged from each other whereby frictional drag between said front cover and said piston is prevented.

2. A lock-up device according to claim 1, wherein said elastic member is an annular wave spring that is compressed between said piston and said first annular friction member in said lock-up position, and said stop member is a snap ring retained in said front cover.

3. A lock-up device according to claim 2 further comprising:
a first support member provided on said piston for supporting a radially inward portion of said first friction member for slidable movement in the axial direction; and
a second support member provided on said front cover for supporting a radially outward portion of said second friction member for slidable movement in the axial direction.

4. A lock-up device according to claim 3, further comprising:
a turbine of said torque converter connecting said piston with said output member; and
a linkage circumferentially elastically connecting said piston to said turbine;
wherein said linkage includes retaining members provided on said piston at an outer circumference, seats provided at an outer circumference of said turbine, and a plurality of torsion springs extending circumferentially and disposed between said retaining members and said seats.

5. A lock-up device according to claim 1, further comprising:
a turbine of said torque converter connecting said piston with said output member; and
a linkage circumferentially elastically connecting said piston to said turbine;
wherein said linkage includes retaining members provided on said piston at an outer circumference, seats provided at an outer circumference of said turbine, and a plurality of torsion springs extending circumferentially and disposed between said retaining members and said seats.

6. A torque converter for transmitting torque comprising:
a front cover having an inside friction surface;
an impeller fixed to said front cover and forming a hydraulic fluid chamber with said front cover;
an output turbine located opposite said impeller;
a stator disposed between said turbine and said impeller;
a lock-up device including a piston connected to said turbine, a first annular friction member fixed to said piston and a second annular friction member fixed to said front cover, said first annular friction member being disposed between said second annular friction and said front cover inside friction surface so that said first and second friction members, said front cover and said piston are mutually engaged in a lock-up position of said piston; and
when lock-up is released, flow of hydraulic fluid in said fluid chamber acts to maintain said first annular friction member in a first axially spaced position with respect to said piston and said second annular friction member in a second axially spaced position with respect to said front cover such that said friction members are separated, so that said piston and said front cover are maintained frictionally disengaged from each other whereby frictional drag between said first front cover and said piston is prevented,
said first annular friction member being slidable in an axial direction and not rotatable relative to said piston, and said second annular friction member being slidable in an axial direction and not rotatable relative to said front cover; and,
an elastic member located between said piston and said first annular friction member and setting a spacing therebetween in a lock-up released condition, and a snap ring retained in said front cover for limiting axial displacement of said second annular friction member toward said piston, whereby clearance between said front cover, said first and second annular friction members and said piston are effected when lock-up is released.

* * * * *